Nov. 6, 1956
O. W. EHLERS
2,769,558
APPARATUS FOR PRODUCING A GLUED UNIT LOAD
Filed July 20, 1953
2 Sheets-Sheet 1
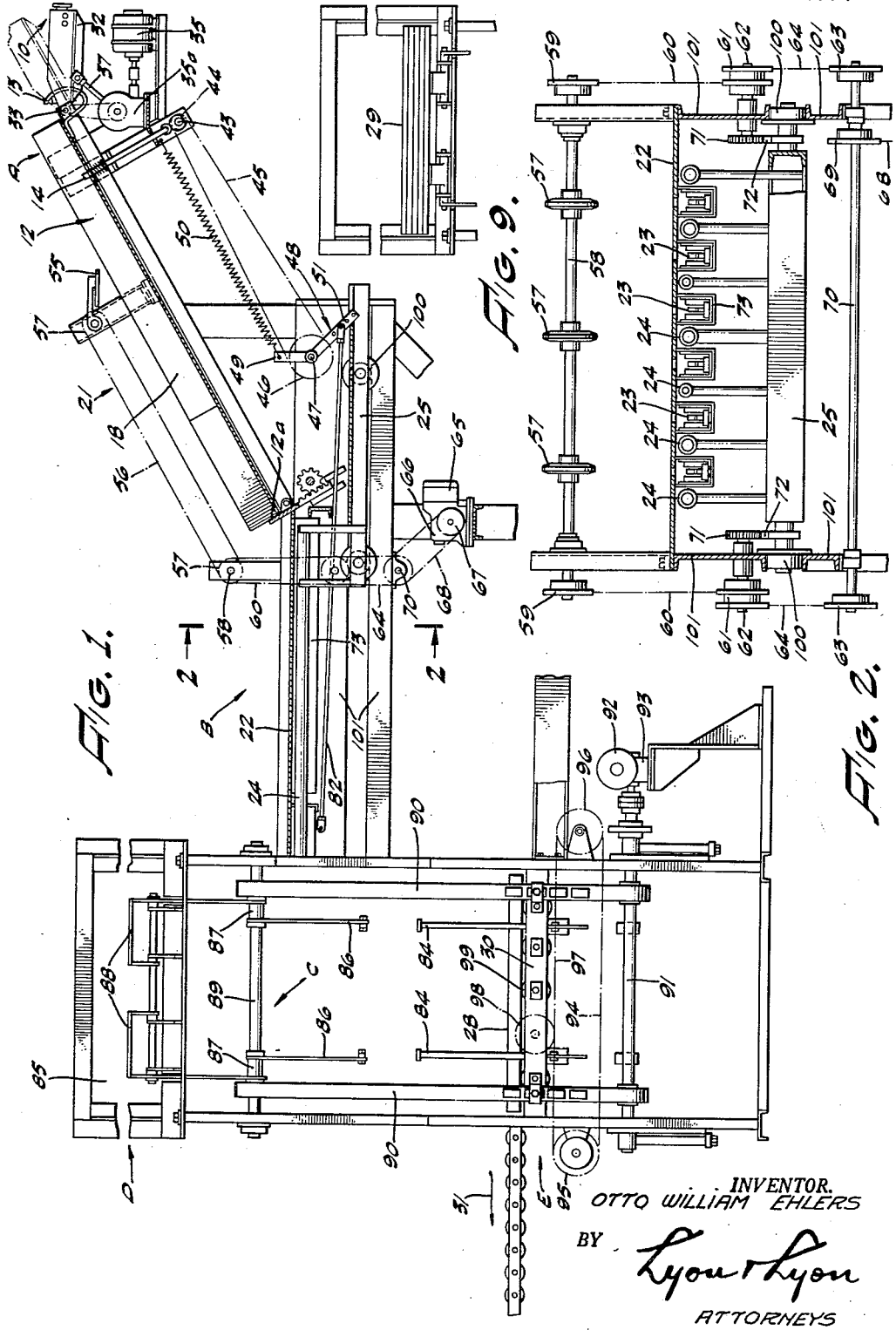
INVENTOR.
OTTO WILLIAM EHLERS
BY
Lyon & Lyon
ATTORNEYS

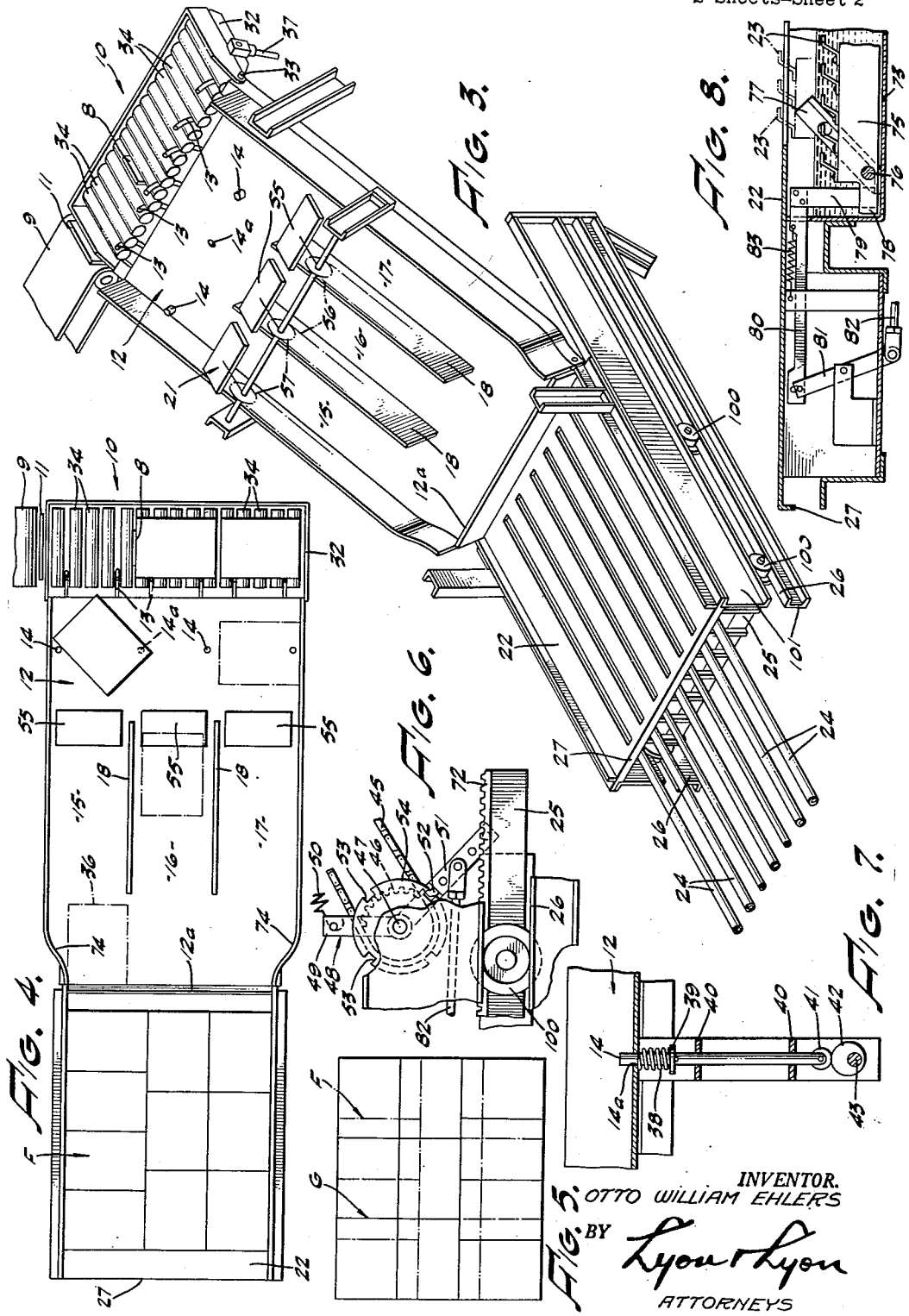

United States Patent Office
2,769,558
Patented Nov. 6, 1956

2,769,558

APPARATUS FOR PRODUCING A GLUED UNIT LOAD

Otto William Ehlers, Hermosa Beach, Calif., assignor to Unitloader, Inc., Los Angeles, Calif., a corporation of California Application July 20, 1953, Serial No. 369,119

13 Claims. (Cl. 214—6)

This invention relates to materials handling apparatus and is particularly directed to a device for producing a glued unit load of cartons or other containers.

The Bruce Patent No. 2,633,251 shows a palletizing machine which receives cartons from a conveyor and stacks them on pallets for transportation or storage. However, this Bruce patent requires that a turntable be employed at the terminal end of the conveyor for selectively turning individual cartons 90° in order to form the required pattern of each layer of cartons on the pallet. A further shortcoming of the palletizing machine shown in the Bruce patent is that the cartons are not glued together to form a unit load but are simply stacked in layers without gluing.

It is the principal object of this invention to remedy these and other limitations in palletizing machines and to provide a device for producing a glued unit load. Another object is to provide such a device which employs either a pallet or a heavy sheet of paper, or the like, as the base of the unit load. Another object is to provide a machine of this type which operates to move a group of cartons or other containers laterally from the terminal end of a conveyor by gravity or by power to a stacking position, and to turn certain of the cartons 90° during such lateral movement to form layer patterns for the unit load. Another object is to provide novel means for applying a suitable adhesive material to a lower surface of each carton during such lateral movement, so that the cartons are glued together in the stack. Other and more detailed objects and advantages will appear hereinafter.

In the drawings:

Figure 1 is a side elevation showing a preferred embodiment of my invention.

Figure 2 is a transverse sectional view taken substantially on the lines 2—2 as shown in Figure 1.

Figure 3 is a perspective view, certain parts being omitted or broken away for clarity of illustration.

Figure 4 is a plan view of a portion of the device, shown in diagrammatic form.

Figure 5 is a diagram showing one form of stacking pattern.

Figure 6 is an enlarged detail of a portion of the device shown in Figure 1.

Figure 7 is a sectional detail of one of the carton orienting pins.

Figure 8 is a sectional view showing details of one of the glue applicators.

Figure 9 shows a paper feed hopper for use in place of the pallet feed mechanism shown in Figure 1.

Referring to the drawings:

There is provided a carton receiving and orienting section, generally designated A, a carton accumulating and gluing section B, a stacking section C, a pallet or paper feeding section D, and a unit load delivery section E. For convenience, these various sections of the device may be mounted on a unitary framework.

In the general scheme of operation, cartons or other containers are delivered in single file by a conventional conveyor and to a tiltable section 10 at the terminal end of the conveyor line. A mechanically operated stop or abutment 11 is interposed to interrupt delivery of the cartons from the conveyor to the tiltable section 10. The tiltable section is then raised to cause the cartons to move laterally by gravity and to enter an inclined chute 12. Individual fingers 13 are provided at the upper end of the chute and these fingers are of different lengths so that the cartons move sequentially from the tiltable section 10 into the upper end of the chute 12.

A plurality of orienting pins 14 is mounted for projection into the path of movement of the individual cartons, and these pins function to turn certain of the cartons through 90° and thus orient them in a pre-determined pattern for stacking. The cartons may move laterally on a conveyor having powered rollers, the orienting pins being positioned between rollers, or as shown in the drawings, the cartons may slide down an inclined chute 12 by gravity, contacting the orienting pins en route. The cartons are each guided into a plurality of pockets 15, 16, and 17, formed by the side plates 18, and the first carton to enter each pocket engages the retractable bar 12ª at the lower end of the chute 12.

The stop 11 is retracted to permit another group of cartons to enter the tiltable section 10 and is again projected to halt further delivery of cartons. The section 10 is again tilted to deliver another group of cartons to the inclined chute 12. This sequence of operations is repeated until sufficient cartons are accumulated to constitute a full layer in the stack to be subsequently formed. The bar 12ª is then withdrawn downwardly. A power feed mechanism generally designated 21 is provided for moving the group of cartons from the inclined chute onto the stationary slotted plate 22, which is provided on the carton accumulating and gluing section B. Glue applicators 23 extend through slots in the plate 22 and apply glue to the under surfaces of each of the cartons. The cartons on the slotted plate 22 are pushed into the stacking section C by the action of the power feed mechanism 21 in delivering subsequent cartons to the slotted plate 22. The cartons move to the left as viewed in Figure 1 and move off the slotted plate 22 and onto parallel rods or tubes 24 projecting from a carriage 25 mounted to roll on horizontal rails 26. When a complete layer of cartons has been advanced into the structure of the stacking section C and is wholly supported on the projecting rods 24, the carriage 25 is retracted to the right to pull the rods 24 out from under the layer of cartons. The layer of cartons is prevented from returning with the carriage and rods by means of a lip 27 provided at the end of the slotted plate 22. The unsupported cartons then drop onto a pallet 28 or a sheet of heavy paper or fiber board 29 which is supported on a vertically movable platform structure 30. Layers of cartons are accumulated on the platform structure 30, layer after layer, producing a glued unit load. The unit load is then delivered from the machine in the direction of the arrow 31.

Proceeding to a more detailed description of the individual parts of the apparatus, the conveyor 9 may take any suitable or desirable form. Its purpose is to bring the cartons or other containers in single file order to the tiltable section 10. When the stop 11 is raised, the conveyor 9 may continue its motion but the cartons thereon back up by the abutment formed by the stop 11 and are only fed forward onto the section 10 when the stop 11 is retracted. The tiltable section 10 may comprise a tilting frame 32 pivoted at 33 and containing a plurality of loosely mounted rollers 34. The rollers 34 need not be power driven. A motor 35 drives a reduction gear 35ª and this in turn operates a crank arm 37 for swinging the tilting frame 32 about its pivotal support 33. When the motor 35 is actuated to tilt the section 10 a carton resting on the rollers 34 adjacent the stop 11 is the first one to escape the holding action of the fingers 13 since the fingers adjacent the stop 11 are shorter than the others. The fingers 13 at the other end of the section 10 are the longest of the group and, therefore, the carton held by these fingers is the last to slide laterally from the rollers 34. As the crank arm 37 operates to tilt the section 10, the carton adjacent the stop 11 is the first to slide down the chute 12. The adjacent carton on the rollers 34 is the next to enter the chute 12 and finally the carton most remote from the stop 11 escapes its longer holding fingers and also enters the chute.

The cartons are released sequentially in order to give each ample turning room on the inclined chute and to avoid interference of turning of the other cartons. As shown in Figure 4, the first carton is turned about the pin 14 which is extended through the floor of the chute. The second and third cartons have not yet moved laterally from the tilting section 10. Since the chute is inclined the carton swings about the projected pin 14 and enters the pocket 15 in a lengthwise manner, having completed a 90° turn from the position it occupied on the conveyor. The first carton conveniently assumes the position shown in dashed lines 36.

The second carton slides off the rollers when the tilting section 10 causes it to clear its respective fingers 13. This carton engages another of the orienting pins 14 and the carton thereupon swings through 90° as it slides down the inclined chute 12 and enters the pocket 16. The third carton remote from the stop 11 is the last to leave the rollers 34 because its respective stop fingers are the longest. It passes down the chute without turning since its respective stop pin is in retracted position. The stop pins 14 each project through an opening 14a in the floor of the inclined chute 12. A spring 38 acts on a collar 39 in a direction to retract the pin. Axially spaced guides 40 act as sliding bearings for each pin 14. A follower roller 41 is mounted on the lower end of each of the pins 14 and this roller engages a cam 42 fixed to the transverse shaft 43. The shape of the cams 42 and their respective angular position on the shaft 43 is such that turning movement of the shaft through a one-quarter revolution retracts certain of the pins 14 and advances certain of the others.

It is preferable when assembling a unit load on a pallet or sheet of paper to use different patterns for alternate layers of cartons. A first pattern designated F is shown in Figure 4 and in the dotted lines in Figure 5. A second pattern designated C is shown by the full lines in Figure 5. The joints between cartons are staggered between adjacent layers when the alternating layers use different patterns as shown. When forming pattern G, the first and third pins 14 are raised as shown in Figure 4. When forming pattern F the second and fourth pins 14 are raised.

Means are provided for turning the cam shaft 43 as shown in the drawings. This means includes a sprocket 44 fixed on the cam shaft 43 and driven by chain 45 from the driving sprocket 46 mounted on the shaft 47. (See Figure 6.) A bell crank 48 is pivotally mounted on the shaft 47 and is provided with a first crank arm 49 which is engaged by one end of a relatively long spring 50. A second arm 51 on the bell crank 48 carries a spring loaded pawl 52 which is adapted to engage one of four notches 53 provided in a plate 54 fixed to the sprocket 46. When the arm 51 is swung in a counterclockwise direction as viewed in Figure 6, the pawl 52 enters one of the slots 53 and turns the plate 54 and sprocket 56 in the same direction. This in turn causes the chain 45 to turn the sprocket 44 on the cam shaft 43. Since the sprocket 46 is twice the size of the sprocket 44 a one-quarter revolution turn of the shaft 47 results in a one-half turn of the cam shaft 43. Release of the arm 51 allows the spring 50 to return arm 51 to its initial position. A bevelled edge on the pawl 52 permits it to retract out of one notch 53 so that it may enter another notch in the plate 54 when the arm 51 moves clockwise through a one-quarter revolution. From the above description it will be understood that swinging of the arm 51 in a counterclockwise direction as viewed in Figure 6 results in raising two of the aligning pins 14 and retracting the other two.

The patterns F and G, as shown in Figures 4 and 5, each require a total of ten cartons. Since three cartons are released each time section 10 is fully raised, one additional carton is needed to complete either pattern. After the first three groups of three cartons each have moved down the inclined chute, the single tenth carton to complete pattern F is admitted into the tiltable conveyor section 10 to engage the retractable step 8 which may be projected upward between two of the rollers 34. Subsequent tilting of the section 10 causes the tenth carton to move down the chute 12 and enter the pocket 15 for incorporation into the pattern F.

When the last single carton is needed to complete pattern G, the stop 11 is raised. After a single carton has entered the tiltable section 10 from the conveyor 9 the inertia of its motion in entering the section 10 carries it along on the freely rotatable rollers 34 until it reaches the far end of the section 10. When the frame 32 is tilted there is only one single carton to slide down the chute 12 and it enters the pocket 17.

The power feed mechanism 21 may take any convenient or desirable form and, as shown in the darwings, includes a plurality of pusher plates 55 each carried on a chain 56 extending over aligned sprockets 57. Power is supplied to turn the sprockets and cause the pusher plates to move downward along the inclined path to push cartons before them on to the slotted plate 22. Power reaches the sprockets 57 through shaft 58, sprockets 59, chains 60 and double sprockets 61. The double sprockets 61 are fixed on stub shafts 62 and are in turn driven by sprockets 63 through chain 64. Electric motor 65 driving a reduction gear 66 turns drive sprockets 67 and chain 68 to turn the driven sprocket 69 fixed on the shaft 70.

The stub shafts 62 also carry drive gears 71 which mesh with horizontal racks 72 fixed on the retractable carriage 25. From the above description it will be understood that the action of the pushers 55 is co-ordinate with the motion of the carriage 25 and bar 12a so that when the pushers 55 move downward along the lower portion of the inclined chute 12, the bar 12a is retracted and the carriage 25 moves forward to project the parallel rods 24 beyond the exit end of the slotted plate 22. Similarly, when the carriage 25 is retracted, the pushers 55 return to their starting position, and the bar 12a is raised to its operative position.

When the carriage 25 moves forward (toward the left as viewed in Figure 1) the spring 50 swings the arm 51 in a clockwise direction. When the carriage 25 is retracted to the right, a portion thereof engages the arm 51 and swings it in a counterclockwise direction thereby causing the pawl 52 to engage within a notch 53 in the plate 54 and turn the sprocket 46 through a one-quarter revolution. The chain 45 thereupon turns the similar sprocket 44 through a one-half revolution and in this way changes the setting of the pins 14 so as to produce a different pattern of cartons in the next layer or group.

Any suitable or desirable means may be used for applying glue to the underside of the cartons. As shown in the drawings, the glue applying mechanism may comprise a series of elongated tanks 73 which are mounted on the frame beneath the slots on the plate 22. A series of glue applicators 23 are mounted on a carrier 75. The pins 76 fixed to opposite ends of the carriers 75 are arranged to ride in inclined tracks 77 fixed on the tanks 73. Each of the bars 75 is provided with an eye 78 which slidably receives a vertical rod 79. An actuating bar 80 is fixed to the upper end of the rod 79 and this bar 80 is moved horizontally by means of a lever 81. This lever is connected by means of a link 82 to the crank arm 81 on the shaft 47. When the link 82 pulls the lower end of the lever 81 to the right, as viewed in Figure 8, the bar 80 moves to the left and the carrier 75 moves forward and downward to lower the applicators 23 below the level of the glue in the tank 73. When the link 82 moves to the left, the spring 83 assists in returning the bar 80 toward the right, causing the carrier 75 to raise upward within the tank 73 and extend the applicators 23 through the slots in the plate 22.

The pallet feeding hopper 85, shown in Figure 1, may take any suitable or desirable form. It is only necessary that a pallet 28 drop from the hopper 85 onto the platform 30 each time the platform is raised after delivery of a glued unit load. Fingers 86 fixed on sleeves 87 serve to actuate the pallet release mechanism 88 whenever the levers 84 on the platform 30 are raised to engage the fingers 86. The sleeves 87 are mounted to turn on the shaft 89. The platform 30 may be raised and lowered by means of chains or belts 90 which pass over sprockets or pulleys mounted on the shafts 89 and 91. The shaft 91 may be driven by means of a motor 92 and reduction gear 93.

A chain 94 may be provided to pass over aligned sprockets 95 and 96 so that its upper flight 97 is horizontal. Power means (not shown) are provided for driving the chain 94. When the platform 30, which is carried on the belts or sprockets 90, reaches its lower elevation the sprocket 98 on the platform 30 engages the upper flight 97 of the chain 94. The sprocket 98 then turns each of the rollers 99 on the platform through gear means, not shown, so that the rollers cause the glued unit load resting thereon to move off the platform 30 in the direction of the arrow 31.

The motor 92 is operated at the proper time intervals to cause the platform 30 to be lowered for a distance equal to the height of one of the layers of cartons. Each time the carriage 25 is retracted to withdraw the bars 24 and deposit a layer of cartons, the platform 30 is lowered for the proper distance to receive another layer of cartons.

The paper feed hopper, shown in Figure 9, may be substituted for the pallet feed hopper 85, shown in Figure 1. The glued unit load may, therefore, be carried on a pallet 28 or upon a sheet of heavy paper or fiber board 29. In either case the unit load is preferably glued to the pallet 28 or paper sheet 29. The element which is fed from the hopper above the platform 30 serves as a support for the glued unit load. The pallets or paper sheets are conveniently loaded into the hopper by means of high lift fork trucks (not shown).

The operation of the device will be understood from the preliminary description and the details of construction set forth above. It will be observed that the cartons can comprise any form of container and may even constitute bags or cans. The orienting pins 14 and the proportions of the inclined chute 12 may be changed to conform to any particular type of carton or any desired pattern for the layers of the unit load. The side walls of the chute 12 are narrowed, as shown at 74, in order that the cartons may be clamped together laterally. Longitudinal clamping of the cartons in each layer is achieved by the frictional resistance encountered in passing over the slotted plate 22. Longitudinal displacement of cartons in either of the layer patterns is prevented by the alignment of the pusher plates 55 which act on the rear faces of the last cartons in each of the two patterns. The pushers 55 move in conjunction with the carriage 25 and this carriage is mounted on wheels 100 rolling between parallel rails 101.

The glue on the under side of the cartons causes them to adhere to the upper surface of the pallet or paper or fiber board sheet. The platform 30 is then lowered for a distance equal to the depth of a layer of cartons. The carriage 25 is moved to bring the rods 24 into position over the layer just assembled. Another layer of cartons, in a different pattern, is then moved into the stacking section C onto the rods 24 in the manner described above. Glue has also been applied to the under surfaces of the cartons in this second layer. The carriage 25 is again retracted to allow the cartons in the second layer to rest on the cartons in the first layer and the glue effects adherence between the two layers. This procedure continues until a pile or load of desired height is formed and the net result is a unit load having first layers spot glued to the pallet or paper sheet and all of the layers spot glued together. This unitary structure is then moved from the stacking section C by means of the power driven rollers 99 on unit load delivery section E. The platform structure 30 is returned to its uppermost position, a new pallet or sheet of paper is fed into position upon it. The cycle repeats to provide additional unit loads.

Automatic operation may be achieved by providing suitable timing or interlocks for controlling operation of the stops 8 and 11, the tilting motor 35, the motor 65 for driving the pusher plates 55 and the retractable carriage 25, the retractable bar 12ª, the motor 92 for lowering the platform 30, and the motor, not shown, for driving the chain 94 to cause lateral delivery of the completed unit load. The electrical interconnections for operating these devices in proper sequence and timing are within the province of a skilled designer in this field.

Having fully described my invention, it is to be understood that I do not wish to be limited to the details herein set forth, but my invention is of the full scope of the appended claims.

I claim:

1. In a device for receiving cartons from a conveyor and assembling them into a unit load, the combination of: a terminal conveyor section for receiving cartons in single file order, means for moving a group of cartons laterally from said conveyor section toward a stacking location, selectively operable orienting means for turning cartons at right angles during the course of such lateral movement, a retractable member at said stacking location adapted to receive a plurality of groups of cartons, and means for retracting said member from below said groups of cartons to form a layer of a unit load.

2. In a device for receiving cartons from a conveyor and assembling them into a unit load, the combination of: a terminal conveyor section for receiving cartons in single file order, a vertically movable platform, means for moving a group of cartons laterally from said conveyor section toward said platform, selectively operable orienting means for turning cartons at right angles during the course of such lateral movement, a horizontal retractable member adapted to receive a plurality of groups of cartons, and means for retracting said member from below said groups of cartons to form a layer of a unit load upon said platform.

3. In a device for receiving cartons from a conveyor and assembling them into a unit load, the combination of: a terminal conveyor section for receiving cartons in single file order, means for tilting said conveyor section to cause lateral movement of a group of cartons toward a stacking location, selectively operable orienting means for turning cartons at right angles during the course of such lateral movement, a retractable member adapted to receive a plurality of groups of cartons, and means for retracting said member from below said groups of cartons to form a layer of a unit load.

4. In a device for receiving cartons from a conveyor and assembling them into a glued unit load, the combination of: a terminal conveyor section for receiving cartons in single file order, means for moving a group of cartons laterally from said conveyor section toward a stacking location, selectively operable orienting means for turning cartons at right angles during the course of such lateral movement, means for applying adhesive glue material to the lower surfaces of said cartons during said lateral movement, a retractable member at said stacking location adapted to receive a plurality of groups of cartons, and means for retracting said member from below said groups of cartons to form a layer of a glued unit load.

5. In a device for receiving cartons from a conveyor and assembling them into a glued unit load, the combination of: a terminal conveyor section for receiving cartons in single file order, means for tilting said conveyor section to cause lateral movement of a group of cartons toward a stacking location, selectively operable orienting means for turning cartons at right angles during the course of such lateral movement, means for applying adhesive glue material to the lower surfaces of said cartons during said lateral movement, a retractable member adapted to receive a plurality of groups of cartons, and means for retracting said member from below said groups of cartons to form a layer of a glued unit load.

6. In a device for receiving cartons from a conveyor and assembling them into a glued unit load, the combination of: a terminal conveyor section for receiving cartons in single file order, a vertically movable platform, a sheet feeding device for depositing a paper sheet on said platform, means for moving a group of cartons laterally from said conveyor section toward said platform, selectively operable orienting means for turning cartons at right angles during the course of such lateral movement, means for applying adhesive material to the lower surfaces of said cartons during said lateral movement, a horizontal retractable member adapted to receive a plurality of groups of cartons, and means for retracting said member from below said groups of cartons to form a layer of a glued unit load upon said paper sheet.

7. In a device for assembling a glued unit load of cartons, the combination of: conveyor means for delivering cartons in single file order to a terminal end thereof, means at said terminal end of the conveyor for moving the cartons laterally, selectively operable orienting means for turning cartons at right angles during such lateral movement, means for applying adhesive glue material to the lower surfaces of the cartons, and means for depositing the cartons in layers on a support in a break-joint relationship to form a glued unit load.

8. In a device for assembling a glued unit load of cartons, the combination of: conveyor means for delivering cartons in single file order to a terminal end thereof, means at said terminal end of the conveyor for moving the cartons laterally, selectively operable orienting means for turning cartons at right angles during such lateral movement, means for applying adhesive material to the lower surfaces of the cartons, a paper sheet, and means for depositing the cartons in layers on said paper sheet in a break-joint relationship to form a glued unit load.

9. In a device for assembling a glued unit load of cartons, the combination of: conveyor means for delivering cartons in single file order to a terminal end thereof, means at said terminal end of the conveyor for moving the cartons laterally, selectively operable orienting means for turning cartons at right angles during such lateral movement, means for applying adhesive material to the lower surfaces of the cartons, a vertically movable platform, feed means for depositing a paper sheet upon said platform, and means for depositing the cartons in layers on said paper sheet in a break-joint relationship to form a glued unit load.

10. In a device for assembling a glued unit load of cartons, the combination of: conveyor means for delivering cartons in single file order to a terminal end thereof, means at said terminal end of the conveyor for moving the cartons laterally, selectively operable orienting means for turning cartons at right angles during such lateral movement, means for applying adhesive glue material to the lower surfaces of the cartons, and means for depositing the cartons in layers of two alternate patterns on a support in a break-joint relationship to form a glued unit load.

11. In a device for mechanically assembling a glued unit load from articles delivered in single file order by a conveyor, the combination of: means to receive articles from the conveyor, means including a gravity chute for selectively turning articles at right angles in the course of movement of said chute into either one of two different patterns, a glue applicator, means for transporting the oriented articles past the glue applicator means whereby glue may be applied to the lower surface of each of the articles, vertically movable support means, means for delivering an element having an upper surface onto said support means, means for transporting the glued oriented articles to rest on the upper surface of said element, means for lowering said support means in progressive steps substantially equal to the height of said articles whereby a glued unit load may be assembled on said element.

12. In a device for mechanically assembling a glued unit load from articles delivered in single file order by a conveyor, the combination of: means to receive articles from the conveyor, means including a gravity chute for selectively turning articles at right angles in the course of movement of said chute into either one of two different patterns, adhesive glue applying means, means for transporting the oriented articles past the adhesive glue applying means whereby adhesive glue may be applied to the lower surface of each of the articles, vertically movable support means, means for delivering an element having an upper surface onto said support means, means for transporting the glued oriented articles to rest on the upper surface of said element, means for lowering said support means in progressive steps substantially equal to the height of said articles whereby a glued unit load may be assembled on said element, and means for removing the glued unit load from said support means as a unitary structure.

13. In a device for receiving cartons in single file from the terminal end of a conveyor and stacking them in layers upon a support, the combination of: means for transporting groups of cartons laterally from the terminal end of the conveyor, orienting means for turning certain of the cartons through one-quarter revolution during such lateral movement, means for shifting the orienting means to cause the cartons to form either of two patterns for alternate layers in a stack, a retractable member adapted to receive a layer of cartons so oriented, means for retracting said member from below said cartons for stacking, and means responsive to movement of said retractable member for shifting said orienting means.

References Cited in the file of this patent

UNITED STATES PATENTS

| | | |
|---|---|---|
| 1,454,520 | Purcell | May 8, 1923 |
| 2,564,493 | Moffat | Aug. 14, 1951 |
| 2,600,747 | Faust | June 17, 1952 |
| 2,608,949 | Pasotti | Sept. 2, 1952 |
| 2,633,251 | Bruce | Mar. 31, 1953 |